United States Patent
Han et al.

(10) Patent No.: US 9,806,324 B2
(45) Date of Patent: Oct. 31, 2017

(54) SECONDARY BATTERY

(71) Applicant: SAMSUNG SDI CO., LTD., Yongin-si, Gyeonggi-do (KR)

(72) Inventors: Minyeol Han, Yongin-si (KR); Sangwon Byun, Yongin-si (KR); Sujin Yoon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 161 days.

(21) Appl. No.: 14/637,266

(22) Filed: Mar. 3, 2015

(65) Prior Publication Data

US 2015/0349320 A1 Dec. 3, 2015

(30) Foreign Application Priority Data

Jun. 2, 2014 (KR) .......................... 10-2014-0067263

(51) Int. Cl.
| | |
|---|---|
| *H01M 2/34* | (2006.01) |
| *H01M 2/30* | (2006.01) |
| *H01M 2/20* | (2006.01) |
| *H01M 2/04* | (2006.01) |
| *H01M 2/26* | (2006.01) |

(Continued)

(52) U.S. Cl.
CPC .......... *H01M 2/348* (2013.01); *H01M 2/043* (2013.01); *H01M 2/0426* (2013.01); *H01M 2/26* (2013.01); *H01M 2/30* (2013.01); *H01M 10/4235* (2013.01); *H01M 2/0473* (2013.01); *H01M 2/0486* (2013.01); *H01M 10/0413* (2013.01); *H01M 10/0431* (2013.01); *H01M 2200/10* (2013.01); *H01M 2200/103* (2013.01); *H01M 2200/20* (2013.01)

(58) Field of Classification Search
None
See application file for complete search history.

(56) References Cited

U.S. PATENT DOCUMENTS

| | | | |
|---|---|---|---|
| 2013/0059170 A1* | 3/2013 | Kim ...................... | H01M 2/043 429/7 |
| 2013/0095374 A1* | 4/2013 | Kim ...................... | H01M 2/30 429/179 |
| 2013/0115511 A1 | 5/2013 | Han et al. | |

FOREIGN PATENT DOCUMENTS

| | | |
|---|---|---|
| JP | 11-040204 A | 2/1999 |
| KR | 10-2013-0050070 A | 5/2013 |

OTHER PUBLICATIONS

English machine translation of Japanese Publication No. JP 11-040204, dated Feb. 12, 1999, 16 pages.

* cited by examiner

*Primary Examiner* — Yoshitoshi Takeuchi
(74) *Attorney, Agent, or Firm* — Lewis Roca Rothgerber Christie LLP (57) ABSTRACT

According to some embodiments of the present invention, a secondary battery includes: an electrode assembly including a first electrode plate, a second electrode plate, and a separator between the first electrode plate and the second electrode plate; a case accommodating the electrode assembly and including a top opening; a cap plate sealing the top opening of the case and including a short-circuit hole; a first electrode terminal electrically coupled to the first electrode plate and protruding to an upper portion of the cap plate; an inductive element electrically coupled to the first electrode terminal and having self-inductance; a first connection plate electrically coupled to the inductive element and separated from the cap plate; and an inversion plate in the short-circuit hole.

18 Claims, 8 Drawing Sheets

(51) Int. Cl.
*H01M 10/42* (2006.01)
*H01M 10/04* (2006.01)

SECONDARY BATTERY

CROSS-REFERENCE TO RELATED APPLICATION

This application claims priority to and the benefit of Korean Patent Application No. 10-2014-0067263 filed in the Korean Intellectual Property Office on Jun. 2, 2014, the content of which is incorporated herein by reference in its entirety.

BACKGROUND

1. Field

Aspects of the present invention relate to a secondary battery.

2. Description of the Related Art

Secondary batteries are rechargeable, unlike primary batteries. Among such secondary batteries, a low capacity battery including a battery cell in the form of a battery pack may be used for small portable electronic devices such as cellular phones and camcorders, and a high capacity battery including dozens of battery cells coupled to one another may be used as a motor-driving power source for hybrid vehicles, or electric vehicles.

Secondary batteries may be manufactured in various shapes such as a cylindrical shape and a prismatic shape. A secondary battery may be constructed as follows: an electrode assembly formed by positioning an insulating separator between a positive electrode plate and a negative electrode plate is placed in a case together with electrolyte, and a cap assembly having electrode terminals is arranged on the case.

Meanwhile, when an internal pressure of a secondary battery rises due to excess heat generated by over-charging or decomposition of an electrolytic solution within the battery, a fire or explosion may occur within the secondary battery. Accordingly, it is necessary to manufacture a secondary battery having improved safety.

The above information discussed in this Background section is only for enhancement of understanding of the background of the described technology and therefore it may contain information that does not constitute prior art that is already known to a person having ordinary skill in the art.

SUMMARY

Aspects of embodiments of the present invention include a secondary battery, which may prevent or substantially prevent an internal pressure from excessively rising due to electrical short circuits when the internal pressure of the secondary battery rises and which may have stability against electrical short circuits due to external factors.

Other aspects of the present invention include a secondary battery, which may suppress a short-circuited state from being terminated such that an inversion plate and a connection plate are first melted before a fuse part operates, and which allows the fuse part to operate in a secured manner by causing or enabling short-circuit current to flow.

According to aspects embodiments of the present invention, a secondary battery includes an electrode assembly including a first electrode plate, a second electrode plate, and a separator between the first electrode plate and the second electrode plate; a case accommodating the electrode assembly and including a top opening; a cap plate sealing the top opening of the case and including a short-circuit hole; a first electrode terminal electrically coupled to the first electrode plate and protruding to an upper portion of the cap plate; an inductive element electrically coupled to the first electrode terminal and having self-inductance; a first connection plate electrically coupled to the inductive element and separated from the cap plate; and an inversion plate in the short-circuit hole.

The inductive element may couple the first electrode terminal and the first connection plate to each other and may include a coil shape.

The inductive element may couple the first electrode terminal and the first connection plate to each other and may include at least one conductive plate on the first connection plate, an insulating layer on an outer surface of the first connection plate, and a portion of the first connection plate may be exposed through the insulating layer.

The at least one conductive plate may include a first conductive plate on the first connection plate, a second conductive plate on a top surface of the first conductive plate, and a first terminal plate on a top surface of the second conductive plate and coupled to the first electrode terminal.

Each of the first conductive plate and the second conductive plate may be U-shaped and may have a top surface, a bottom surface, a U-shaped first end and a U-shaped second end.

In the first conductive plate and the second conductive plate, a top exposed region may be formed on a top surface of the first end and a bottom exposed region may be formed on a bottom surface of the second end.

The second conductive plate may be horizontally rotated 90° relative to the first conductive plate, and the first end of the first conductive plate and the second end of the second conductive plate may contact each other.

The first conductive plate may be electrically coupled to the first connection plate through the bottom exposed region, and the second conductive plate may be electrically coupled to the first conductive plate through the bottom exposed region.

A bottom surface of the first terminal plate may include a bottom exposed region, and the bottom exposed region of the first terminal plate may correspond to the top exposed region of the second conductive plate.

The first terminal plate may include a terminal hole through which the first electrode terminal passes, and the terminal hole may include an internal exposed region, and the first terminal plate may be electrically coupled to the first electrode terminal through the internal exposed region.

An entirety of the top surface of the first terminal plate may be exposed.

The first conductive plate, the second conductive plate, and the first terminal plate may be coupled to one another.

The cap plate may be electrically coupled to the second electrode plate and the cap plate may be electrically insulated from the first connection plate and the inductive element.

The inversion plate may be configured to be deformed to come into contact with the first connection plate to generate a short circuit current when an internal pressure of the case exceeds a preset pressure.

The inversion plate may have a round part convexly formed toward the electrode assembly and a flange part fixed to the cap plate.

A second electrode terminal may be electrically coupled to the second electrode plate and protrude to an upper portion of the cap plate.

The secondary battery may further include: a first collector plate electrically coupling the first electrode plate and the first electrode terminal to each other; and a second collector plate electrically coupling the second electrode plate and the second electrode terminal to each other.

The second collector plate may include: a second electrode connection unit coupled to the second electrode plate; a second terminal connection unit coupled to the second electrode terminal; and a connection part coupling the second electrode connection unit and the second terminal connection unit to each other and comprising a fuse hole formed therein.

According to aspects of embodiments of the present invention, the secondary battery may prevent or substantially prevent an internal pressure from excessively rising due to electrical short circuits when the internal pressure of the secondary battery rises and which may have stability against electrical short circuits due to external factors.

In addition, the secondary battery according to embodiments of the present invention may suppress a short-circuited state from being terminated such that an inversion plate and a connection plate are first melted before a fuse part operates, and allows the fuse part to operate in a secured manner by causing short-circuit current to flow.

Additional aspects and/or characteristics of the invention will be set forth in part in the description which follows and in part will be apparent from the description or may be learned by practice of the invention.

BRIEF DESCRIPTION OF THE DRAWINGS

Aspects, features, and characteristics of the present invention will be more apparent from the following detailed description in conjunction with the accompanying drawings, in which.

DETAILED DESCRIPTION

Hereinafter, example embodiments of the present invention will be described in some detail with reference to the accompanying drawings such that they can easily be made and used by those skilled in the art.

As used throughout, the term "and/or" includes any and all combinations of one or more of the associated listed items. In addition, the terminology used herein is for the purpose of describing particular embodiments and is not intended to be limiting of the invention. As used herein, singular forms are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element.

Figure 1:
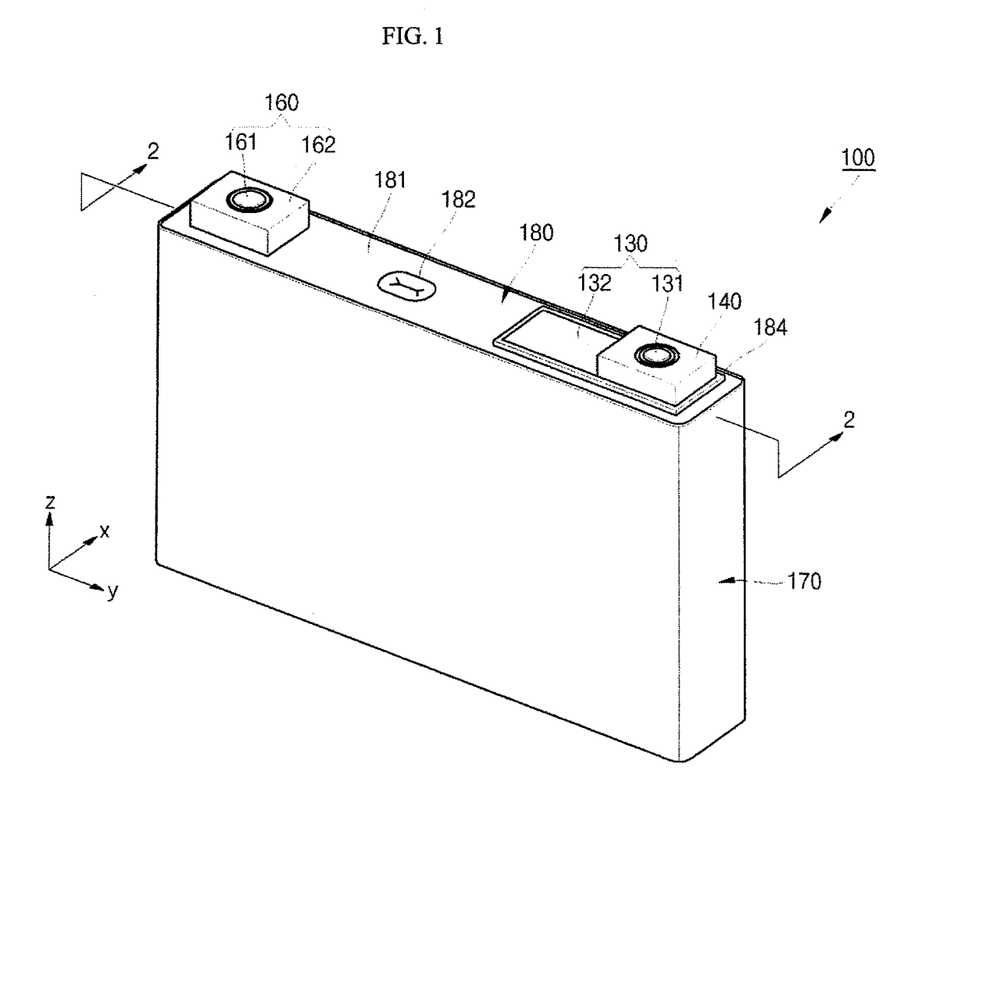
FIG. 1 is a perspective view of a secondary battery according to embodiments of the present invention.
Figure 2:
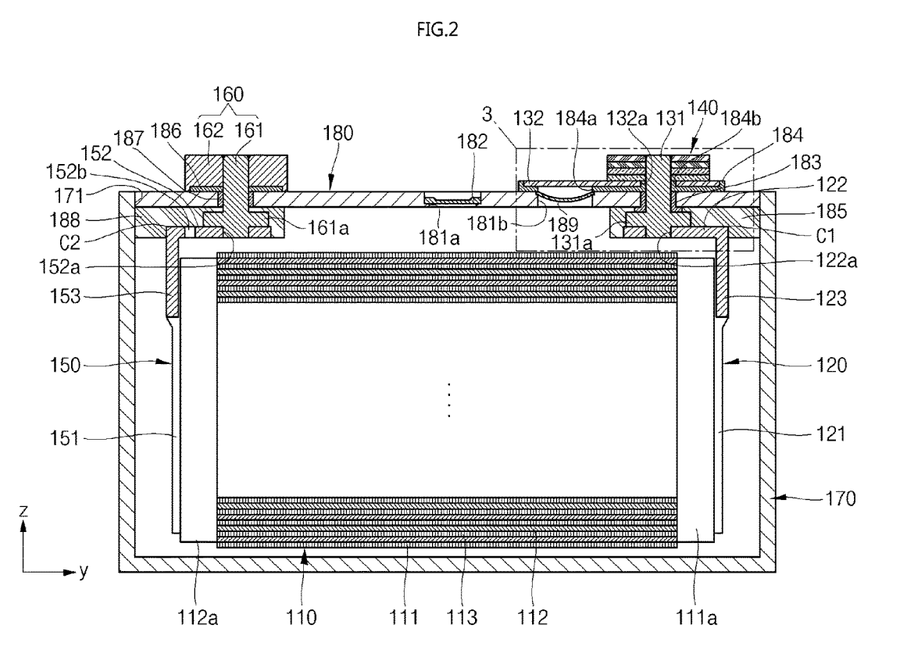
FIG. 2 is a cross-sectional view of a secondary battery, taken along the line 2-2 of FIG. 1.
Figure 3:
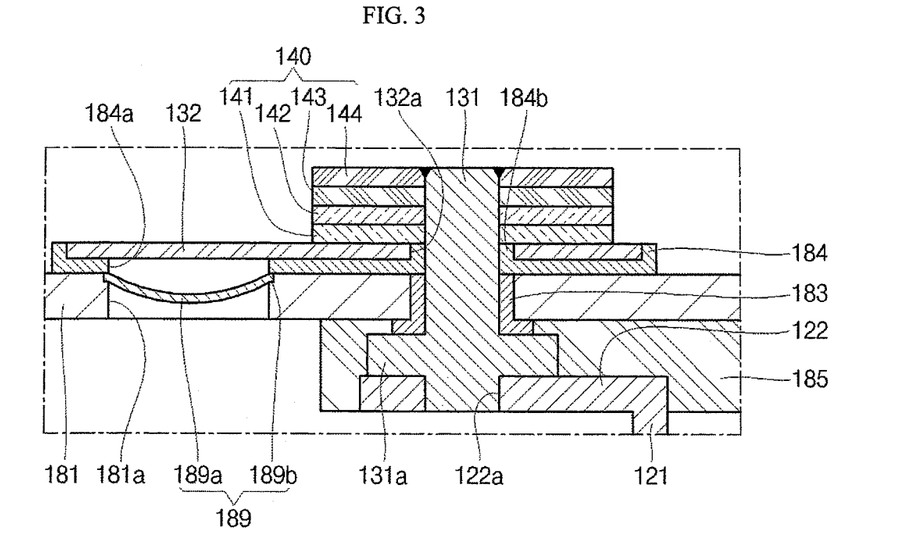
FIG. 3 is an enlarged view illustrating a portion 3 of FIG. 2, which is a cross-sectional view prior to an inversion plate being inverted.
Figure 4:
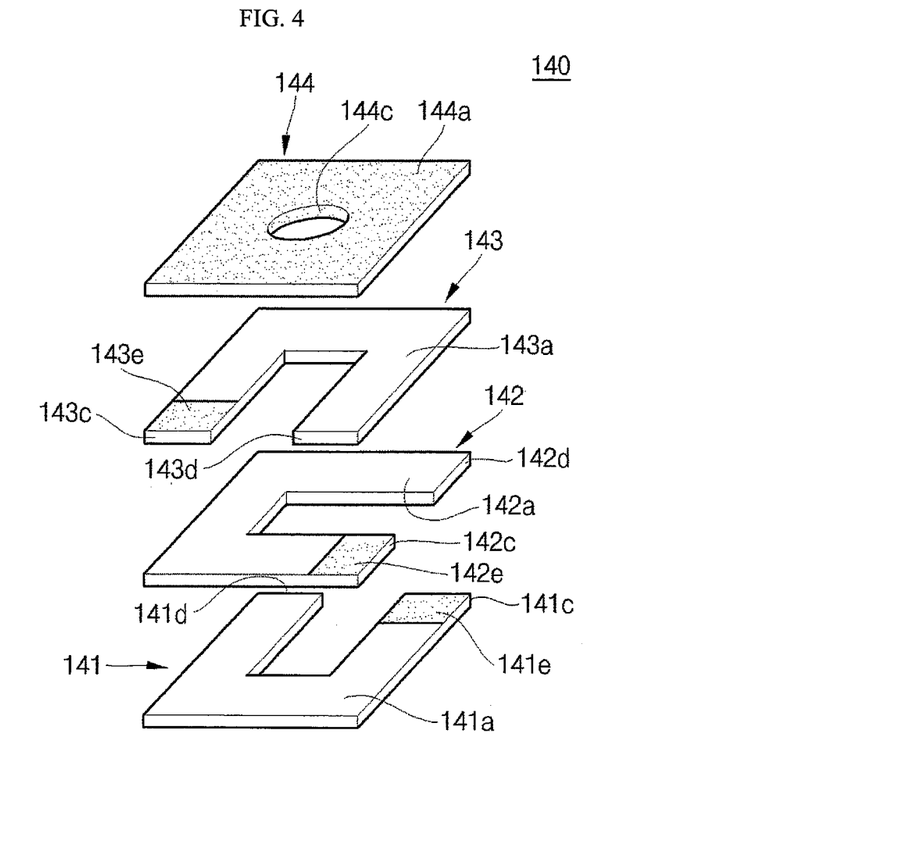
FIG. 4 is an exploded perspective top view of an inductive element of a secondary battery according to embodiments of the present invention.
Figure 5:
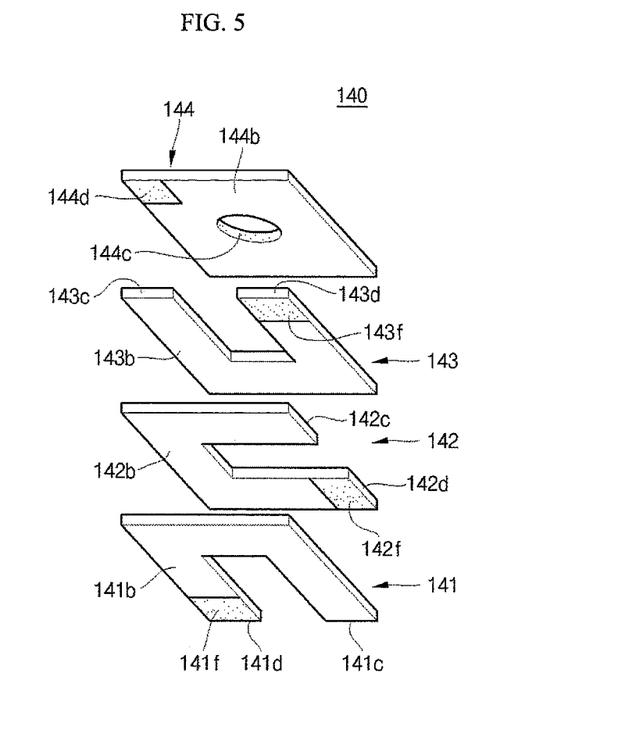
FIG. 5 is an exploded perspective bottom view of an inductive element of a secondary battery according to embodiments of the present invention.
Figure 6:
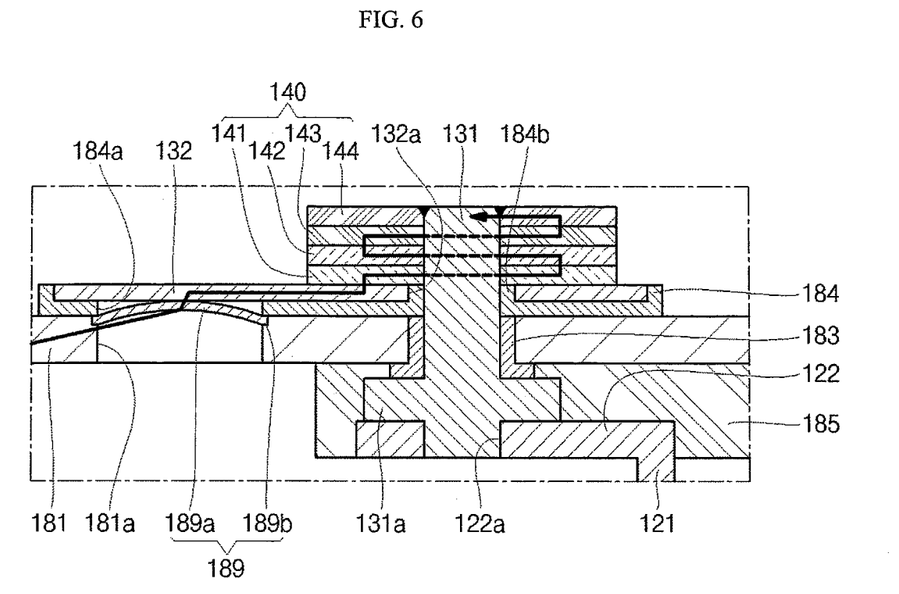
FIG. 6 is a cross-sectional view illustrating the flow of short circuit current after the inversion plate shown in FIG. 3 is inverted.
Figure 7:
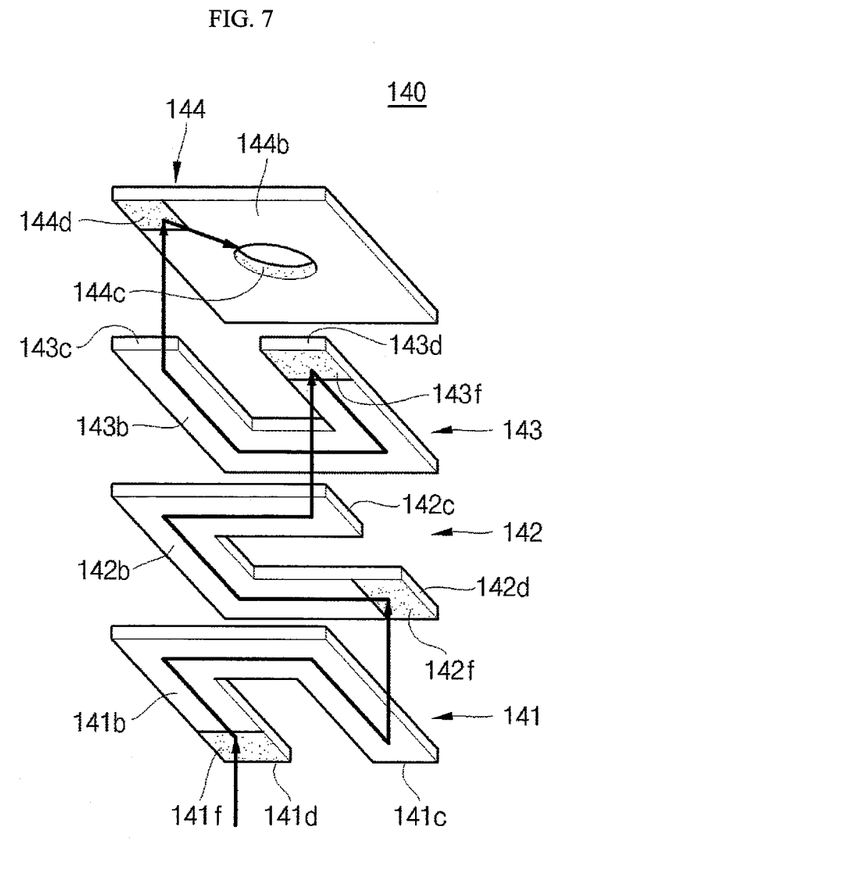
FIG. 7 illustrates the flow of short circuit current in the inductive element after the inversion plate is inverted.
Figure 8:
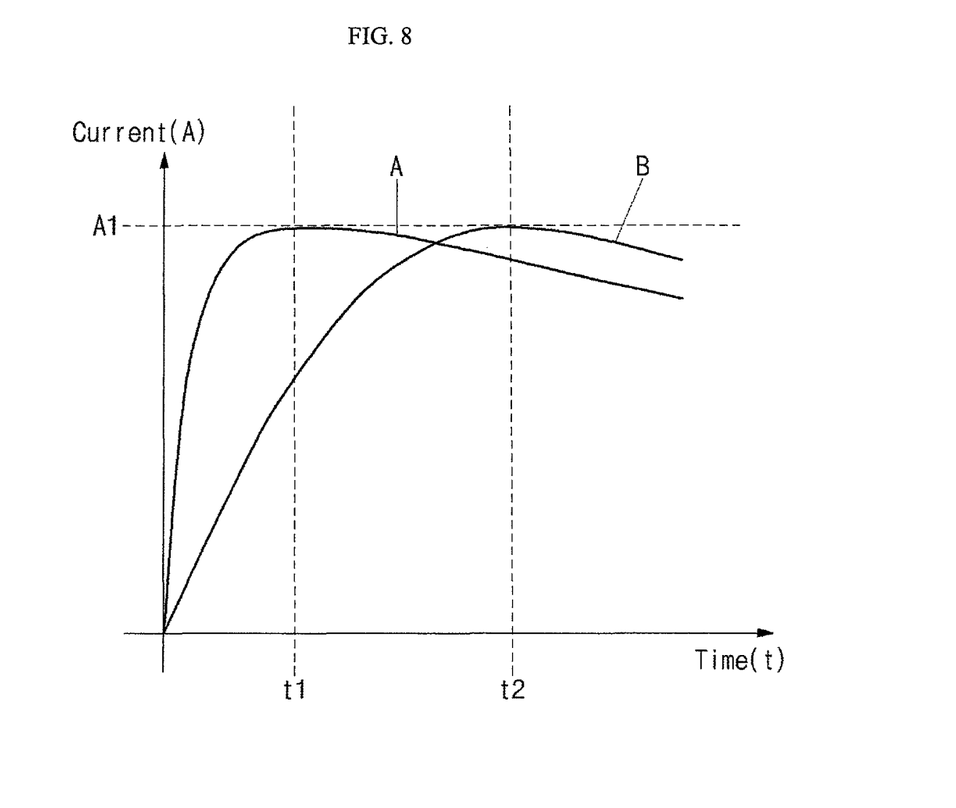
FIG. 8 is a graph for comparing a short circuit current generated per unit time in the conventional secondary battery and the secondary battery according to embodiments of the present invention.

FIG. 1 is a perspective view of a secondary battery according to some embodiments of the present invention, FIG. 2 is a cross-sectional view of a secondary battery, taken along the line 2-2 of FIG. 1, FIG. 3 is an enlarged view illustrating a portion 3 of FIG. 2, which is a cross-sectional view illustrating a state in which an inversion plate has yet to be inverted, FIG. 4 is an exploded perspective top view of an inductive element of a secondary battery according to some embodiments of the present invention, FIG. 5 is an exploded perspective bottom view of an inductive element of a secondary battery according to some embodiments of the present invention, FIG. 6 is a cross-sectional view illustrating the flow of short circuit current after the inversion plate shown in FIG. 3 is inverted, FIG. 7 illustrates the flow of short circuit current in the inductive element after the inversion plate is inverted, and FIG. 8 is a graph for comparing a short circuit current generated per unit time in the conventional secondary battery and the secondary battery according to some embodiments of the present invention.

First, referring to FIGS. 1 and 2, the secondary battery 100 according to some embodiments of the present invention includes an electrode assembly 110, a first collector plate 120, a first terminal part (or first terminal) 130, an inductive element 140, a second collector plate 150, a second terminal part (or second terminal) 160, a case 170, and a cap assembly 180. A plurality of the secondary battery 100 of the present invention may be coupled in series to each other, constituting a large-capacity battery pack configured to output a high voltage.

The electrode assembly 110 may be formed by winding or laminating a stacked structure of a first electrode plate 111, a separator 113, and a second electrode plate 112, which are formed of thin plates or layers. Here, the first electrode plate 111 may operate as a negative electrode and the second electrode plate 112 may operate as a positive electrode.

The first electrode plate 111 may be formed by coating a negative electrode active material layer (made from, e.g., a transition metal oxide) on a negative electrode collector (made from a metallic foil, e.g. copper (Cu) or nickel (Ni) foil). The negative electrode active material of the negative electrode active material layer may include a carbon-based material, Si, Sn, tin oxide, composite tin alloys, a transition metal oxide, a lithium metal nitride, and/or a lithium metal oxide, but not limited thereto. In addition, the first electrode plate 111 may include a first electrode uncoated portion 111a that is not coated with the negative electrode active material.

The first electrode uncoated portion 111a may become a path of current flow between the first electrode plate 111 and an outside of the first electrode plate 111. The material of the first electrode plate 111 is not limited to those listed herein.

The second electrode plate 112 may be formed by coating a positive electrode active material layer on a positive electrode collector (made from a highly conductive metallic foil, e.g. an aluminum (Al) foil). The positive electrode active material of the positive electrode active material layer may include a chalcogenide compound, for example, composite metal oxides such as $LiCoO_2$, $LiMn_2O_4$, $LiNiO_2$, $LiNiO_2$, $LiNi_{(1-x)}Co_xO_2$ (0<x<1), and $LiMnO_2$, but not limited thereto. In addition, the second electrode plate 112 may include a second electrode uncoated portion 112a that is not coated with the positive electrode active material.

The second electrode uncoated portion 112a may become a path of current flow between the second electrode plate 112 and an outside of the second electrode plate 112. The material of the second electrode plate 112 is not limited to those listed herein.

The first electrode plate 111 and the second electrode plate 112 may have different polarities. That is to say, the first electrode plate 111 may serve as a positive electrode and the second electrode plate 112 may serve as a negative electrode.

The separator 113 may prevent an electric short between the first electrode plate 111 and the second electrode plate 112 and may allow only lithium ions to pass. The separator 113 may be formed from, e.g., polyethylene (PE), polypropylene (PP) or a composite film of polyethylene (PE) and polypropylene (PP). The material of the separator 113 is not limited to those listed herein. The separator 113 may have a larger width than the first electrode plate 111 and the second electrode plate 112, which may facilitate preventing an electric short between the first electrode plate 111 and the second electrode plate 112.

A first collector plate 120 and a second collector plate 150, which are electrically coupled to the first electrode plate 111 and the second electrode plate 112, respectively, may be coupled with opposite ends of the electrode assembly 110. The first collector plate 120 and the second collector plate 150 may be coupled with opposite ends of the first electrode uncoated portion 111a and the second electrode uncoated portion 112a positioned at the opposite ends of the electrode assembly 110.

The electrode assembly 110 may be accommodated in the case 170 together with an electrolyte. The electrolyte may include a lithium salt (e.g., $LiPF_6$ or $LiBF_4$) and an organic solvent (e.g., ethylene carbonate (EC), propylene carbonate (PC), diethyl carbonate (DEC), ethyl methyl carbonate (EMC), or dimethyl carbonate (DMC)). In an implementation, the electrolyte may be in a liquid, solid, or gel phase.

The first collector plate 120 may be made from at least one conductive material selected from aluminum, copper, a copper alloy, and equivalents thereof.

The first collector plate 120 may contact the first electrode uncoated portion 111a that protrudes at one end of the electrode assembly 110 to then be electrically coupled to the first electrode plate 111. The first collector plate 120 may include a first electrode connection unit 121 coupled to the first electrode plate 111, a first terminal connection unit 122 coupled to the first terminal part 130, and a first connection part 123 coupling the first electrode connection unit 121 and the first terminal connection unit 122. The first collector plate 120 is formed in a single body or as a single continuous material. The first collector plate 120 has a corner part formed by bending the first connection part 123 and may be substantially L-shaped.

The first electrode connection unit 121 may contact the first electrode uncoated portion 111a that protrudes at one end of the electrode assembly 110 to then be electrically coupled to the first electrode plate 111.

The first electrode connection unit 121 may be welded to the first electrode uncoated portion 111a and is allowed to stand in a perpendicular direction.

The first terminal connection unit 122 is welded to the first terminal part 130 and is shaped of a plate that substantially laterally extends to be installed between the cap plate 181 of the cap assembly 180 to be described later and the electrode assembly 110. A first fastening hole 122a may be formed in the first terminal connection unit 122 to pass through between top and bottom surfaces of the first terminal connection unit 122. A first electrode terminal 131 of the first terminal part 130 may be fitted into the first fastening hole 122a. That is to say, the first fastening hole 122a may be sized to correspond to the first electrode terminal 131 so as to accommodate the first electrode terminal 131.

One side of the first connection part 123 is coupled to the first electrode connection unit 121 and the other side thereof is coupled to the first terminal connection unit 122. The first connection part 123 has a corner part bent between the one side and the other side thereof and may be shaped of substantially L-shaped.

The first terminal part 130 may include a first electrode terminal 131 and a first connection plate 132.

The first electrode terminal 131 may pass through a cap plate 181 to be described later and may extend and protrude upwardly by a predetermined length. In addition, the first electrode terminal 131 may be electrically coupled to the first collector plate 120 under the cap plate 181. The first electrode terminal 131 may have a laterally extending flange 131a under the cap plate 181 to prevent the first electrode terminal 131 from being dislodged from the cap plate 181 as the first electrode terminal 131 extends and protrudes upwardly from a top surface of the cap plate 181 by a predetermined length. A region of the first electrode terminal 131 under the flange 131a may be fitted into the first fastening hole 122a of the first collector plate 120 to then be riveted or welded therewith. In addition, a region of the first electrode terminal 131 on the flange 131a may pass through the cap plate 181 and may extend and protrude upwardly by the predetermined length. The first connection plate 132 and the inductive element 140 may be fixed at the extending and protruding region.

The first connection plate 132 is spaced apart from the cap plate 181 by an upper insulation member 184 to be described later and is arranged to be parallel with the cap plate 181.

The first connection plate 132 is generally formed from a conductive metal or material and/or equivalents thereof and is electrically coupled to the first electrode terminal 131. However, the first connection plate 132 is spaced apart from the first electrode terminal 131 so that it is not brought into direct contact therewith and is electrically coupled to the first electrode terminal 131 through the inductive element 140.

A first terminal hole 132a is formed in the first connection plate 132 to allow a top portion of the first electrode terminal 131 to pass therethrough. Here, the first terminal hole 132a may be sized to be larger than the first electrode terminal 131 to prevent the first connection plate 132 and the first electrode terminal 131 from coming into direct contact with each other, and an extension part 184b of the first upper insulation member 184 to be described later is inserted between the first electrode terminal 131 and the first terminal hole 132a.

Referring to FIGS. 4 and 5, the inductive element 140 includes a first conductive plate 141, a second conductive plate 142, a third conductive plate 143 and a first terminal plate 144. Although three conductive plates 141, 142, and 143 of the inductive element 140 are illustrated for ease of explanation, a fourth conductive plate and a fifth conductive plate may be sequentially stacked between the third conductive plate 143 and the first terminal plate 144.

The first conductive plate 141 is formed in a substantially U-shaped plate having a top surface 141a and a bottom surface 141b, which are substantially planar. In addition, the first conductive plate 141 has a first end 141c and a second end 141d, forming a U-shaped configuration. That is to say, the top portion of the first electrode terminal 131 passes through between the first end 141c and the second end 141d.

The first conductive plate 141 may be made of at least one conductive material selected from aluminum, copper, a copper alloy and equivalents thereof and has an insulating layer coated or adhered to its outer surface.

However, a top exposed region 141e on which the insulating layer is not formed exists in a region of the top surface 141a, for example, a region of the top surface 141a of the first end 141c. In addition, a bottom exposed region 141f on which the insulating layer is not formed exists in a region of the bottom surface 141b, for example, a region of the bottom surface 141b of the second end 141d.

That is to say, the first conductive plate 141 may be electrically coupled to the first connection plate 132 through the bottom exposed region 141f.

However, the first conductive plate 141 and the first electrode terminal 131 may not be directly electrically coupled to each other.

The second conductive plate 142 has substantially the same shape with the first conductive plate 141, and is formed in a substantially U-shaped plate having a top surface 142a and a bottom surface 142b, which are substantially planar. That is to say, the second conductive plate 142 is configured such that the top portion of the first electrode terminal 131 passes through between the first end 142c and the second end 142d.

In addition, the second conductive plate 142 may be made of the same material with the first conductive plate 141, for example, at least one conductive material selected from aluminum, copper, a copper alloy and equivalents thereof and has an insulating layer coated or adhered to its outer surface.

However, a top exposed region 142e on which the insulating layer is not formed exists in a region of the top surface 142a, for example, a region of the top surface 142a of the first end 142c. In addition, a bottom exposed region 142f on which the insulating layer is not formed exists in a region of the bottom surface 142b, for example, a region of the bottom surface 142b of the second end 142d.

Here, the second conductive plate 142 is horizontally rotated 90° relative to the first conductive plate 141 to then be stacked on the first conductive plate 141. Accordingly, the bottom exposed region 142f of the second conductive plate 142 is brought into contact with the top exposed region 141e of the first conductive plate 141, thereby electrically coupling the first conductive plate 141 and the second conductive plate 142.

However, the second conductive plate 142 and the first electrode terminal 131 are not directly electrically coupled to each other.

Here, the second conductive plate 142 may be fixed on the first conductive plate 141 using a conductive or insulating adhesion member.

The third conductive plate 143 has substantially the same shape with the first conductive plate 141 and the second conductive plate 142, and is formed in a substantially U-shaped plate having a top surface 143a and a bottom surface 143b, which are substantially planar. In addition, the third conductive plate 14 has a first end 143c and a second end 143d, which are U-shaped. That is to say, the third conductive plate 143 is configured such that the top portion of the first electrode terminal 131 passes through between the first end 143c and the second end 143d.

In addition, the third conductive plate 143 may be made of the same material with the first conductive plate 141 and the second conductive plate 142, for example, at least one conductive material selected from aluminum, copper, a copper alloy and equivalents thereof and has an insulating layer coated or adhered to its outer surface.

However, a top exposed region 143e on which the insulating layer is not formed exists in a region of the top surface 143a, for example, a region of the top surface 143a of the first end 143c. In addition, a bottom exposed region 143f on which the insulating layer is not formed exists in a region of the bottom surface 143b, for example, a region of the bottom surface 143b of the second end 143d.

Here, the third conductive plate 143 is horizontally rotated 90° relative to the second conductive plate 142 to then be stacked on the second conductive plate 142. That is to say, the third conductive plate 143 is horizontally rotated 180° relative to the first conductive plate 141. Accordingly, the bottom exposed region 143f of the third conductive plate 143 is brought into contact with the top exposed region 142e of the second conductive plate 142, thereby electrically coupling the second conductive plate 142 and the third conductive plate 143.

However, the third conductive plate 143 and the first electrode terminal 131 are not directly electrically coupled to each other.

Here, the third conductive plate 143 may be fixed on the second conductive plate 142 using a conductive or insulating adhesion member.

The first terminal plate 144 is shaped of a plate having a top surface 144a and a bottom surface 144c, which are substantially planar, and has a through-hole 144c that is roughly centrally positioned and has the same size with the first electrode terminal 131 to allow a top portion of the first electrode terminal 131 to pass therethrough.

In addition, the first terminal plate 144 may be made of the same material with the first conductive plate 141, the second conductive plate 142, and the third conductive plate 143, for example, at least one conductive material selected from aluminum, copper, a copper alloy and equivalents thereof and has an insulating layer coated or adhered to its outer surface.

However, a top exposed region on which the insulating layer is not formed exists in a region of the top surface 144a or the entire surface of the top surface 144a. Accordingly, the first terminal plate 144 may be electrically coupled to a separate bus bar or an external device.

In addition, a bottom exposed region 144d on which the insulating layer is not formed exists in a region of the bottom surface 144b, for example, a region corresponding to the top exposed region 143e of the third conductive plate 143. Accordingly, the bottom exposed region 144d of the first terminal plate 144 is brought into contact with the top exposed region 143e of the third conductive plate 143, thereby electrically coupling the third conductive plate 143 and the first terminal plate 144.

In addition, an internal exposed region on which the insulating layer is not formed exists in a region or the entire surface of an inner surface of the first terminal plate 144 having the through-hole 144c. That is to say, the internal exposed region of the first terminal plate 144 is brought into direct contact with the first electrode terminal 131, thereby electrically coupling the first terminal plate 144 and the first electrode terminal 131.

That is to say, a path of the current flowing from the first connection plate 132 to the first electrode terminal 131 is established in the following order from the first connection plate 132 to the bottom exposed region 141f of the first conductive plate 141 to the first conductive plate 141 to the top exposed region 141e of the first conductive plate 141 to the bottom exposed region 142f of the second conductive plate 142 to the second conductive plate 142 to the top exposed region 142e of the second conductive plate 142 to the bottom exposed region 143f of the third conductive plate 143 to the third conductive plate 143 to the top exposed region 143e of the third conductive plate 143 to the bottom exposed region 141d of the first terminal plate 144 to the first terminal plate 144 to the internal exposed region of through-hole 144c and to the first electrode terminal 131.

That is to say, the current flowing in the inductive element 140 has inductance, like the current flowing in a coil, which may hamper the flow of the current flowing in the inductive element 140.

The second collector plate 150 includes a second electrode connection unit 151 coupled to the second electrode plate 112, a second terminal connection unit 152 coupled to the second terminal part 160, and a second connection part 153 coupling the second electrode connection unit 151 and the second terminal connection unit 152. The second collector plate 150 is formed in a single body. The second collector plate 150 may have a corner part formed by bending the second connection part 153 and may be substantially L-shaped. The second collector plate 150 may be made from at least one conductive material selected from aluminum, an aluminum alloy and equivalents thereof.

The second electrode connection unit 151 may contact the second electrode uncoated portion 112a that protrudes at one end of the electrode assembly 110 to then be electrically coupled to the second electrode plate 112. The second electrode connection unit 151 may be welded or otherwise attached to the second electrode uncoated portion 112a and is allowed to stand in a perpendicular direction.

The second terminal connection unit 152 is Welded or otherwise attached to the second terminal part 160 and is shaped of a plate that substantially laterally extends to be installed between the cap plate 181 of the cap assembly 180 and the electrode assembly 110.

A second fastening hole 152a and a fuse hole 152b are formed in the second terminal connection unit 152 so as to pass through between top and bottom surfaces of the second terminal connection unit 152. A second electrode terminal 161 of the second terminal part 160 is fitted into the second fastening hole 152a to then be coupled. That is to say, the second fastening hole 152a may be sized to correspond to the second electrode terminal 161 so as to accommodate the second electrode terminal 161.

The fuse hole 152b is positioned in a region around a corner C2 of the second terminal connection unit 152 so as not to overlap with the second fastening hole 152a coupled to the second electrode terminal 161. The region where the fuse hole 152b is formed has a cross-sectional area smaller than that of the other region of the second terminal connection unit 152 due to the fuse hole 152b.

Therefore, the region where the fuse hole 152b is formed may be melted by high heat generated when a current of 3000 Amperes or greater flows (e.g., instantaneously flows) due to a high-current short occurring to the secondary battery, thereby functioning as a fuse that interrupts the flow of current.

Here, the high-current short may occur when an inversion plate 189 of the cap assembly 180 to be described later and the first connection plate 132 are brought into contact with each other when heat is generated due to over-charging of the secondary battery 100 or an external pressure exceeds a preset pressure due to decomposition of an electrolyte. In addition, the high-current short may occur when the second terminal part 160 and the other side of the first connection plate 132 are brought into contact with each other due to compression of the secondary battery 100 in a Y-axis direction, or when the cap plate 181 and a bottom surface of the first connection plate 132 are brought into direct contact with each other due to compression of the secondary battery 100 in a Z-axis direction. That is to say, when the region where the fuse hole 152b is formed is melted due to occurrence of the high-current short, the flow of current is interrupted, charging or discharging of the secondary battery 100 can be stopped before the secondary battery 100 is confronted with a risk, such as ignition or explosion.

One side of the second connection part 153 is coupled to the second electrode connection unit 151 and the other side thereof is coupled to the second terminal connection unit 152. The second connection part 153 has the corner part C2 bent between the one side and the other side thereof and may be substantially L-shaped.

The second terminal part 160 is generally formed from a metal and/or equivalents thereof and is electrically coupled to the second collector plate 150. In addition, the second terminal part 160 is electrically coupled to the cap plate 181. The second terminal part 160 includes a second electrode terminal 161 accommodated in the second fastening hole 152a of the second collector plate 150 and a second terminal plate 162 coupled to the second electrode terminal 161.

The second electrode terminal 161 passes through the cap plate 181 to be described later extends and protrudes upwardly by a predetermined length and electrically coupled to the second collector plate 150 under the cap plate 181. The second electrode terminal 161 extends and protrudes upwardly from the cap plate 181 by a predetermined length and a laterally extending flange 161a may be formed under the cap plate 181 to prevent the second electrode terminal 161 from being dislodged from the cap plate 181. A region of the second electrode terminal 161 formed under the flange 161a may be fitted into the second fastening hole 152a of the second collector plate 150 to then be riveted or welded. In addition, a region of the second electrode terminal 161 formed on the flange 161a may pass through the cap plate 181 to extend and protrude upwardly from the cap plate 181 by a predetermined length, and the second terminal plate 162 may be fixed at the extending and protruding region.

The second terminal plate 162 is shaped of a plate having a second terminal hole 162a passing through between top and bottom surfaces of the second electrode terminal 162. The second terminal hole 162a of the second electrode terminal 162 may be sized and shaped to horizontally correspond to the second electrode terminal 161 so as to receive the second electrode terminal 161. In the second terminal plate 162, the second electrode terminal 161 protruding upwardly from the cap plate 181 may be fitted into the second terminal hole 162a to then be riveted or welded.

The second terminal part 160 may be made from at least one conductive material selected from aluminum, an aluminum alloy and equivalents thereof, but not limited thereto.

The case 170 may be made from a conductive metal, such as aluminum, an aluminum alloy or nickel plated steel. The case 170 is shaped of a substantially hexahedron having a top opening 171 through which the electrode assembly 110, the first collector plate 120 and the second collector plate 150 are inserted to be placed therein. In FIGS. 1 and 2, the case 170 and the cap assembly 180 are combined with each other, so that the top opening 171 is not clearly defined, but it corresponds to a substantially opened edge portion of the cap assembly 180. Meanwhile, the inner surface of the case 170 is insulated to then be insulated from the electrode assembly 110, the first collector plate 120, the second collector plate 150, and the cap assembly 180.

The cap assembly 180 is coupled to the case 170. In detail, the cap assembly 180 includes a cap plate 181, seal gaskets 182 and 187, a safety vent 183, upper insulation members 184 and 186, lower insulation members 185 and 188 and an inversion plate 189.

The cap plate 181 seals the top opening 171 of the case 170 and may be made from the same material with the case 170. The cap plate 181 may be coupled to the case 170 by, for example, laser welding. The cap plate 181 is electrically coupled to the second terminal part 160 to have the same polarity with the second terminal part 160. Accordingly, the cap plate 181 and the case 170 may have the same polarity. A vent hole 181a and a short-circuit hole 181b passing through between top and bottom surfaces of the cap plate 181 are formed in the cap plate 181. Here, the short-circuit hole 181b is positioned under the first connection plate 132.

The seal gaskets 183 and 187 are made from an insulating material and include a first seal gasket 183 formed between the first electrode terminal 131 and the cap plate 181 and a second seal gasket 187 formed between the second electrode terminal 161 and the cap plate 181. The seal gaskets 183 and 187 seal a portion between each of the first electrode terminal 131 and the second electrode terminal 161 and the cap plate 181. The first seal gasket 183 and the second seal gasket 187 may prevent external moisture from penetrating into the secondary battery 100 or may prevent an electrolyte contained in the secondary battery 100 from flowing out.

The safety vent 183 may be installed in the vent hole 181a of the cap plate 181 and may have a notch configured to be opened at a preset pressure.

The upper insulation members 184 and 186 include a first upper insulation member 184 located between the first connection plate 132 and the cap plate 181 and a second upper insulation member 186 located between the second connection plate 132 and the cap plate 181.

The first upper insulation member 184 electrically insulates the first connection plate 132 and the cap plate 181 from each other. In addition, the first upper insulation member 184 includes an extension part 184b protruding upwardly from the first terminal hole 132a of the first connection plate 132, and the extension part 184b electrically insulates the first connection plate 132 and the first electrode terminal 131 from each other.

In addition, the first upper insulation member 184 makes close contact with the cap plate 181. Further, the first upper insulation member 184 makes close contact with the seal gasket 182. The first upper insulation member 184 insulates the first terminal part 130 and the cap plate 181 from each other.

The second upper insulation member 186 may be positioned between the second connection plate 162 and the cap plate 181 as well, but a portion of the second connection plate 162 comes into contact with the cap plate 181 to then be electrically coupled to the cap plate 181.

The lower insulation members 185 and 188 include a first lower insulation member 185 formed between the first collector plate 120 and the cap plate 181 and a second lower insulation member 188 formed between the second collector plate 150 and the cap plate 181.

The first lower insulation member 185 and the second lower insulation member 188 prevent unnecessary electric shorts from occurring between the first collector plate 120 and the second collector plate 150. That is to say, the first lower insulation member 185 and the second lower insulation member 188 prevents an electric short between the first collector plate 120 and the cap plate 181 and an electric short between the second collector plate 150 and the cap plate 181. In addition, the first lower insulation member 185 and the second lower insulation member 188 are formed between each of the first electrode terminal 131 and the second electrode terminal 161 and the cap plate 181 as well, thereby preventing unnecessary electrical shorts between the first electrode terminal 131 and the cap plate 181 and between the second electrode terminal 161 and the cap plate 181.

The inversion plate 189 is located in the short-circuit hole 181b of the cap plate 181 and is covered by the first connection plate. Here, the inversion plate 189 may include a downwardly convex round part 189a and a flange part 189b fixed to the cap plate 181. Here, the inversion plate 189 has the same polarity with the cap plate 181.

Referring to FIG. 6, the inversion plate 189 is inverted to then upwardly convexly protrude when the internal pressure of the secondary battery 100 exceeds a preset pressure due to over-charging.

In this case, a contact region between the inversion plate 189 and the first connection plate 132 is defined, so that a high short circuit current I flows (e.g., instantaneously flows) through the contact region, and large contact resistance is concentrated on the contact region. Therefore, the inversion plate 189 and the first connection plate 132 are melted earlier than the fuse part operating to interrupt the flow of current, so that a phenomenon in which a shorted state cannot be sustained may occur.

However, when the electrical short is induced, a level of the short circuit current I flowing through the inductive element 140 is offset by self-inductance, thereby preventing the contact region between the inversion plate 189 and the first connection plate 132 from being melted and allowing the fuse part to operate in a secured manner.

Referring again to FIG. 6 together with FIG. 7, according to some embodiments of the present invention, when an internal pressure of the case exceeds a preset pressure due to over-charging occurring to the secondary battery 100, the first connection plate 132 comes into contact with the upwardly convexly protruding inversion plate 189 to generate an electrical short circuit. In addition, as shown in FIG. 6, the short circuit current I may flow from the first electrode plate 111 to the second electrode plate 112 through the cap plate 181.

While the short circuit current I flows through the inductive element 140, the inductive element 140 generates an inductive electromotive force based on self-inductance, which impedes the flow of the short circuit current I, thereby offsetting the level of the instantaneously rising short circuit current I.

Referring to FIG. 8, while the conventional secondary battery demonstrates a graph (A) in which a short circuit current I reaches a high current A1 at a time t1 and a contact region between the inversion plate 189 and the first connection plate 132 is melted due to a spark or arc, the secondary battery 100 according to an embodiment of the present invention demonstrates a graph (B) in which a short circuit current I reaches a high current A1 at a time t2, which is later than the time t1, thereby preventing the contact region between the inversion plate 189 and the first connection plate 132 from being melted and ultimately allowing the fuse to operate in a secured manner.

Although the present invention has been described with reference to certain example embodiments thereof, it will be understood by those skilled in the art that a variety of modifications and variations may be made to the present invention without departing from the spirit or scope of the present invention defined in the appended claims, and their equivalents.

What is claimed is:

1. A secondary battery comprising:
   an electrode assembly comprising a first electrode plate, a second electrode plate, and a separator between the first electrode plate and the second electrode plate;
   a case accommodating the electrode assembly and comprising a top opening;
   a cap plate sealing the top opening of the case and comprising a short-circuit hole;
   a first electrode terminal electrically coupled to the first electrode plate and protruding to an upper portion of the cap plate;
   an inductive element electrically coupled to the first electrode terminal and having self-inductance, wherein the first electrode terminal extends at least partially through the inductive element;
   a first connection plate electrically coupled to the inductive element and separated from the cap plate; and
   an inversion plate in the short-circuit hole.

2. A secondary battery comprising:
   an electrode assembly comprising a first electrode plate, a second electrode plate, and a separator between the first electrode plate and the second electrode plate;
   a case accommodating the electrode assembly and comprising a top opening;
   a cap plate sealing the top opening of the case and comprising a short-circuit hole;
   a first electrode terminal electrically coupled to the first electrode plate and protruding to an upper portion of the cap plate;
   an inductive element electrically coupled to the first electrode terminal and having self-inductance;
   a first connection plate electrically coupled to the inductive element and separated from the cap plate; and
   an inversion plate in the short-circuit hole,
   wherein the inductive element couples the first electrode terminal and the first connection plate to each other and comprises a plurality of conductive plates forming a coil shape.

3. A secondary battery comprising:
   an electrode assembly comprising a first electrode plate, a second electrode plate, and a separator between the first electrode plate and the second electrode plate;
   a case accommodating the electrode assembly and comprising a top opening;
   a cap plate sealing the top opening of the case and comprising a short-circuit hole;
   a first electrode terminal electrically coupled to the first electrode plate and protruding to an upper portion of the cap plate;
   an inductive element electrically coupled to the first electrode terminal and having self-inductance;
   a first connection plate electrically coupled to the inductive element and separated from the cap plate; and
   an inversion plate in the short-circuit hole,
   wherein the inductive element couples the first electrode terminal and the first connection plate to each other and comprises at least one conductive plate on the first connection plate, an insulating layer on an outer surface of the first connection plate, and wherein a portion of the first connection plate is exposed through the insulating layer.

4. The secondary battery of claim 3, wherein the at least one conductive plate comprises a first conductive plate on the first connection plate, a second conductive plate on a top surface of the first conductive plate, and a first terminal plate on a top surface of the second conductive plate and coupled to the first electrode terminal.

5. The secondary battery of claim 4, wherein each of the first conductive plate and the second conductive plate is U-shaped and has a top surface, a bottom surface, a U-shaped first end and a U-shaped second end.

6. The secondary battery of claim 5, wherein in the first conductive plate and the second conductive plate, a top exposed region is formed on a top surface of the first end and a bottom exposed region is formed on a bottom surface of the second end.

7. The secondary battery of claim 6, wherein the second conductive plate is horizontally rotated 90° relative to the first conductive plate, and the first end of the first conductive plate and the second end of the second conductive plate contact each other.

8. The secondary battery of claim 7, wherein the first conductive plate is electrically coupled to the first connection plate through the bottom exposed region, and the second conductive plate is electrically coupled to the first conductive plate through the bottom exposed region.

9. The secondary battery of claim 7, wherein a bottom surface of the first terminal plate comprises a bottom exposed region, and the bottom exposed region of the first terminal plate corresponds to the top exposed region of the second conductive plate.

10. The secondary battery of claim 9, wherein the first terminal plate comprises a terminal hole through which the first electrode terminal passes, and wherein the terminal hole comprises an internal exposed region, and the first terminal plate is electrically coupled to the first electrode terminal through the internal exposed region.

11. The secondary battery of claim 10, wherein an entirety of the top surface of the first terminal plate is exposed.

12. The secondary battery of claim 4, wherein the first conductive plate, the second conductive plate, and the first terminal plate are coupled to one another.

13. The secondary battery of claim 1, wherein the cap plate is electrically coupled to the second electrode plate and the cap plate is electrically insulated from the first connection plate and the inductive element.

14. The secondary battery of claim 13, wherein the inversion plate is configured to be deformed to come into contact with the first connection plate to generate a short circuit current when an internal pressure of the case exceeds a preset pressure.

15. The secondary battery of claim 1, wherein the inversion plate has a round part convexly formed toward the electrode assembly and a flange part fixed to the cap plate.

16. The secondary battery of claim 1, further comprising a second electrode terminal electrically coupled to the second electrode plate and protruding to an upper portion of the cap plate.

17. The secondary battery of claim 16, further comprising:
   a first collector plate electrically coupling the first electrode plate and the first electrode terminal to each other; and a second collector plate electrically coupling the second electrode plate and the second electrode terminal to each other.

18. The secondary battery of claim 17, wherein the second collector plate comprises:
   a second electrode connection unit coupled to the second electrode plate;
   a second terminal connection unit coupled to the second electrode terminal; and a connection part coupling the second electrode connection unit and the second terminal connection unit to each other and comprising a fuse hole formed therein.

\* \* \* \* \*